Figure 1:
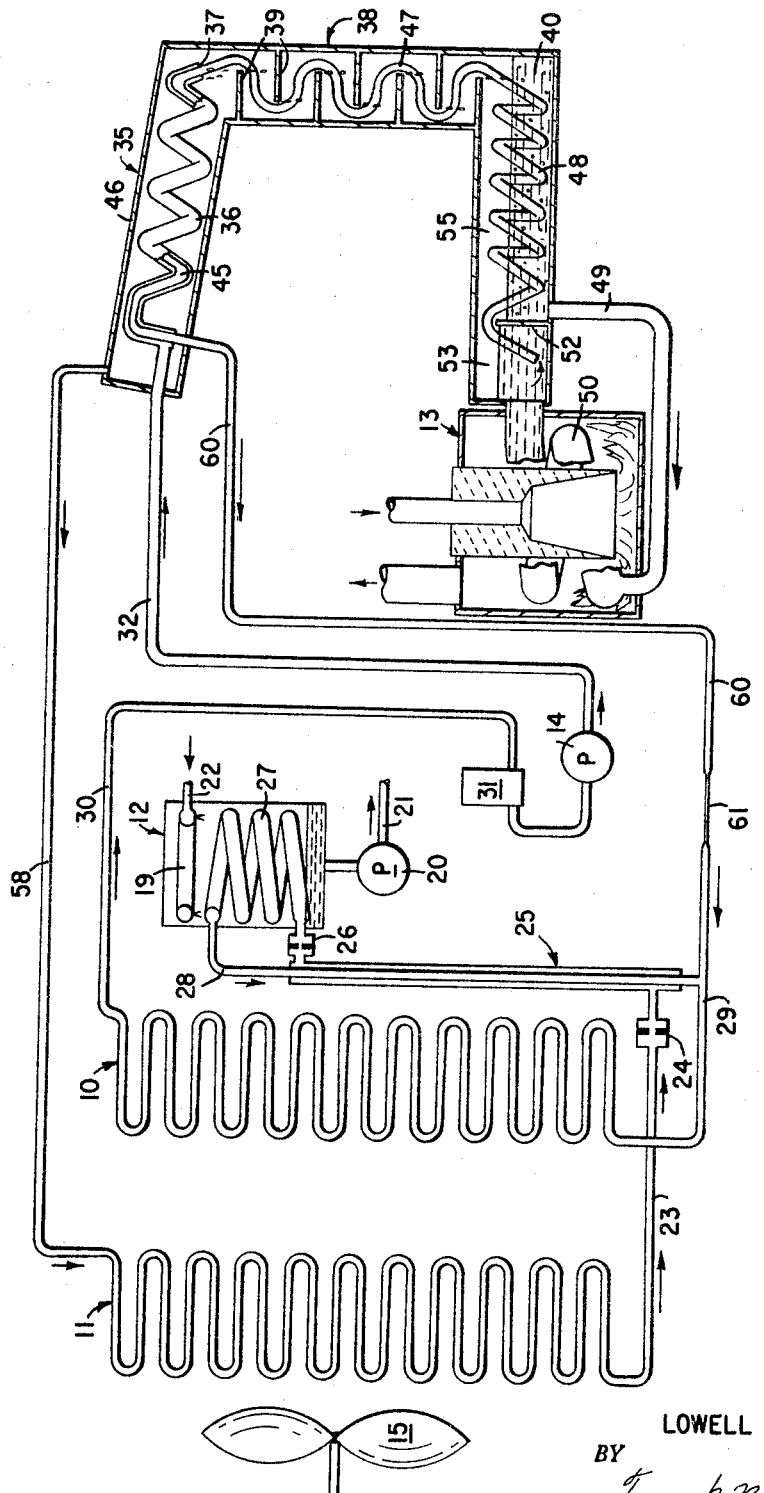

FIG. I

INVENTOR.
LOWELL A. MCNEELY.
BY
Frank N. Decker Jr.
ATTORNEY.

Sept. 6, 1966 L. A. McNEELY 3,270,524
SOLUTION HEAT EXCHANGE ARRANGEMENT IN ABSORPTION
REFRIGERATION SYSTEM
Filed March 30, 1965 2 Sheets-Sheet 2

INVENTOR.
LOWELL A. MC NEELY.
BY
Frank N. Decker Jr.
ATTORNEY.

3,270,524
SOLUTION HEAT EXCHANGE ARRANGEMENT IN ABSORPTION REFRIGERATION SYSTEM
Lowell A. McNeely, Indianapolis, Ind., assignor to Carrier Corporation, Syracuse, N.Y., a corporation of Delaware
Filed Mar. 30, 1965, Ser. No. 443,806
5 Claims. (Cl. 62—495)

This invention relates to absorption refrigeration, and, more particularly, to absorption refrigeration systems of the type which employ an analyzer and a heat exchanger in the solution circuit.

In absorption refrigeration systems, it is usual practice to employ a heat exchanger between weak solution forwarded from the absorber to the generator and strong solution, forwarded from the generator to the absorber, in order to improve the thermodynamic efficiency of the system. It has also been frequent practice to employ an analyzer for enriching the concentration of refrigerant vapor formed in the generator so that relatively pure refrigerant vapor is forwarded to the condenser. Absorption refrigeration systems of the type herein described, may employ water as an absorbent and ammonia as a refrigerant.

In order to achieve a relatively high thermodynamic efficiency, it has been found necessary to carefully determine such factors as the position in the analyzer at which reflux or rectifier condensate is injected into the analyzer column and it has been often found necessary to employ various split solution flow arrangements. While such prior proposals could be efficient, they had the disadvantage that the physical apparatus necessary to achieve the desired optimum refrigeration cycle was highly complex from a manufacturing point of view or required excessive heat exchange surface which was expensive to provide. Such additional manufacturing complexity and cost has usually not been warranted by the potential improvement in the cycle efficiency, especially in the case of relatively small capacity residential type refrigeration units where the initial cost is an especially important factor.

Accordingly, it is a principal object of this invention to provide an improved absorption refrigeration system and method of operating the same which provides a relatively high thermodynamic efficiency.

It is a further object of this invention to provide an improved absorption refrigeration system of relatively high efficiency, which is simple and inexpensive to manufacture and requires a minimum of heat exchange surface, piping and welded connections.

In accordance with a preferred embodiment of this invention, an absorption refrigeration system is provided having an absorber for absorbing refrigerant vapor, an evaporator for evaporating refrigerant and for providing cooling, a generator for concentrating weak solution by vaporizing refrigerant therefrom, and a condenser for condensing the refrigerant vapor formed in the generator. A combined rectifier, analyzer column, and generator reservoir is provided for purifying vapor formed in the generator prior to its passage to the condenser. A solution heat exchanger is provided to transfer heat between strong solution passing from the generator to the absorber and weak solution passing from the absorber to the generator. The solution heat exchanger is designed to heat the weak solution just enough to bring it to substantially its boiling point so that vapor is not formed in the heat exchanger.

The weak solution is discharged along with rectifier condensate into the top of the analyzer, and the strong solution is passed through a heat exchange coil which may extend upwardly through the analyzer. By this arrangement, rectifier condensate is heated by heat exchange with hot, strong solution and some of the absorbed refrigerant therein is vaporized and passed to the rectifier. This process of transferring heat between the strong and weak solutions is concurrent with the normal function of enriching the refrigerant vapor which takes place in the analyzer column.

The weak solution is discharged from the analyzer into a generator reservoir which is preferably located adjacent the lower portion of the analyzer column. Hot strong solution from the generator is passed through a heat exchange coil disposed in the generator reservoir. The hot strong solution causes the weak solution to boil in the generator reservoir thereby vaporizing refrigerant therefrom. The boiling action also wets a portion of the heat exchange coil in contact with the stream of vapor formed by the generator. Thus, mass and heat transfer takes place between the vapor and the weak solution to assist in enriching the refrigerant content of the vapor prior to its passage into the analyzer.

Figure 2:
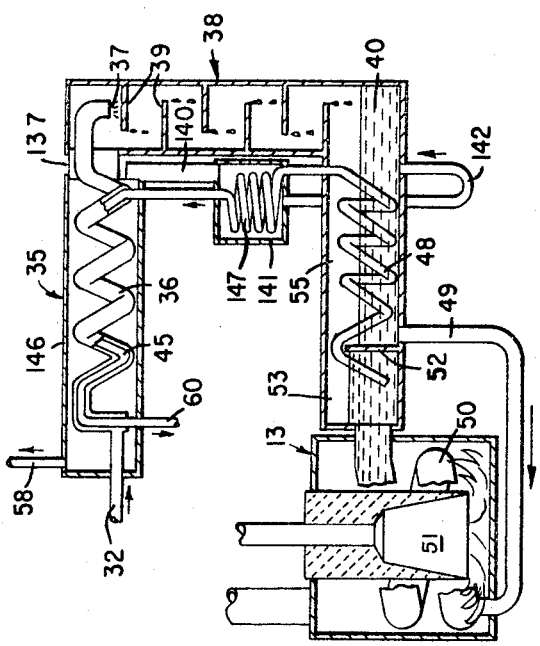

Other features and objects of this invention will become more readily apparent by referring to the following specification and attached drawing wherein:

FIGURE 1 is a schematic flow diagram of an absorption refrigeration system embodying this invention; and FIGURE 2 is a fragmentary, cross-sectional, schematic view of a portion of a modified absorption refrigeration system embodying this invention.

Referring particularly to FIGURE 1, there is shown an absorption refrigeration system having an absorber 10, a condenser 11, an evaporator 12, and a generator 13 connected to provide refrigeration. A pump 14 is employed to circulate weak absorbent solution from absorber 10 to generator 13. As used herein, the term "weak absorbent solution" refers to a solution which is weak in absorbing power, and the term "strong absorbent solution" refers to a solution which is strong in absorbing power. A suitable absorbent solution for use in the system described is water, and a suitable refrigerant is ammonia. For convenience, the absorbent liquid will be referred to as an "absorbent solution" although it will be appreciated that pure water is not technically a solution.

A chilled water pump 20 is provided for forwarding water, or other heat exchange medium chilled in evaporator 12, through chilled water line 21 to a suitable remote location for chilling a refrigeration load. The water is then returned through chilled water line 22 to a spray header 19 from which it is distributed over the exterior of evaporator coil 27.

Liquid refrigerant is passed from condenser 11 through liquid line 23, refrigerant restriction 24, the exterior passage of liquid suction heat exchanger 25 and second refrigerant restriction 26, to evaporator coil 27 of evaporator 12. Heat from the water to be chilled, passing over the exterior of evaporator coil 27, is given up to the refrigerant which vaporizes in the interior of the evaporator coil. The refrigerant vapor passes from coil 27 through vapor line 28, the interior passage of liquid suction heat exchanger 25, to mixing line 29 where it is mixed with strong solution returning to the absorber from the generator.

The mixture of refrigerant vapor and strong solution passes through mixing line 29 into the heat exchange coil which forms absorber 10. Air is passed over the exterior of the absorber coil by fan 15 to cool absorbent solution therein and increase its absorbing power. The absorbent solution is weakened as it absorbs refrigerant vapor during its passage through the absorber. By the time the absorbent solution reaches the discharge end of the absorber coil, the refrigerant vapor is completely absorbed in the absorbent solution and the solution has become weak in absorbing power by the absorption of the vapor.

The weak absorbent solution passes through weak solution line 30 to a purge tank 31 where noncondensible gases are collected and withdrawn from the system. The weak solution is then forwarded by solution pump 14 through weak solution line 32 to combined rectifier and heat exchanger section 35.

Rectifier and heat exchanger section 35, in the preferred embodiment of this invention, comprises an outer shell 46 forming a vapor passage. Shell 46 contains an inner heat exchanger coil 45 and a concentric outer heat exchange coil 36, as shown in the drawing. Preferably outer heat exchange coil 36 is spirally disposed along the inner wall of shell 46 and it may be provided with suitable fins for enhancing heat transfer.

Coils 36 and 45 form a solution heat exchanger between the entire quantity of relatively hot strong solution passing from the generator to the absorber and the entire quantity of relatively cool weak solution passing from the absorber to the generator. The amount of heat transfer surface provided between the strong and weak solution is designed so that the weak solution is brought to just about its boiling point so that vapor is not formed in the solution heat exchanger. Formation of vapor in the solution heat exchanger is undesirable because it results in flow of vapor in the solution circuit in a direction opposite that which provides best thermodynamic efficiency with minimum heat transfer surface. In accordance with this invention, heat from the strong solution is utilized to boil weak solution in the generator reservoir, rather than in the heat exchanger, which is a thermodynamically more advantageous location and results in a flow of vapor through the analyzer and rectifier concurrently with the strong solution.

The weak solution from line 32 passes through coil 36 in the annular space between inner heat exchange coil 45 and outer heat exchange coil 36 where the weak solution is heated to substantially its boiling point by heat exchange with strong solution. After passing through coil 36, the heated weak solution is discharged from opening 37 onto one of a plurality of baffles or plates 39 in analyzer column 38.

Analyzer 38 comprises a tubular member having a plurality of plates 39 which provide surfaces for contact of vapor with the reflux and the solution which wets the surfaces of the plates. The weak solution passes successively over the plurality of plates and is discharged from the bottom of the analyzer into a generator reservoir 40. Generator reservoir 40 provides solution storage for part load operation conditions and allows for solution and refrigerant charging tolerance, and compensates for manufacturing variations in machine volume.

Preferably, rectifier-heat exchanger section 35, analyzer 38, and generator reservoir 40 are formed into a single vessel, as shown in FIGURE 1, for ease of manufacturing and to eliminate piping costs. It will be appreciated, however, that the portions of this vessel may be separated if desired, and need not necessarily be located in the positions relative to one another shown in the drawing. For example, the generator reservoir could be located at a higher elevation and the analyzer could be of the flooded type.

Weak solution from generator reservoir 40 passes through line 49 into generator coil 50. The solution in coil 50 is heated by suitable means such as gas burner 51 causing the solution to boil thereby forming vapor. The vapor and hot solution is discharged from coil 50 into separation chamber 53, formed by a baffle or weir 52, where the vapor separates from the remaining strong solution. Preferably, some of the solution normally spills over the top of baffle 52 and is recirculated through line 49 to generator coil 50. It will be understood that the solution in separation chamber 53 has been concentrated by vaporizing refrigerant therefrom in generator 13.

Vapor formed in generator 13 passes concurrently with strong solution through the vapor passage 55 formed in the upper portion of generator reservoir 40, through analyzer 38, and through the vapor passage formed by shell 46 of rectifier 35 to condenser 11.

The concentrated or strong absorbent solution from separation region 53 is at the relatively high generator pressure and passes through heat exchange coil 48 in generator reservoir 40, heat exchange coil 47 in the analyzer column, and inner heat exchange coil 45 in the rectifier. The strong solution then passes through line 60 and restriction 61 into line 29 and absorber 10 on the relatively low pressure side of the system.

Heat from the strong solution passing through coil 48 boils the weak solution in the generator reservoir to vaporize refrigerant therefrom. The heat exchange which takes place in the generator reservoir 40 results in cooling the strong solution flowing through coil 48 so that it enters the analyzer and rectifier respectively at the best temperature to achieve maximum efficiency with minimum heat transfer surface. It is undesirable to form vapor in the solution heat exchanger but forming vapor in the generator reservoir results in a significant improvement in the over-all efficiency. Thus, heat which could not be effectively utilized in the heat exchanger is utilized to boil refrigerant from solution in the reservoir.

A portion of coil 48 is submerged below the level of weak solution in reservoir 40 and another portion of the coil is disposed in the vapor passage above the weak solution. The boiling of the weak solution causes the portion of coil 48 which is disposed in vapor passage 55 to be wetted with solution. As the strong solution passes through coil 48, it becomes progressively cooler. Vapor formed in the generator and in the reservoir passes through the vapor passage 55 and contacts the exposed wetted portion of coil 48 in reservoir 40, and mass and heat transfer take place with the weak solution boiling in the reservoir. It will be appreciated that ammonia vapor will be boiled from the weak solution in the reservoir and that water vapor will be condensed from the vapor space into the weak solution in proportions resulting in an enrichment of the refrigerant content of the vapor passing through the reservoir. Also, the condensation of water vapor into the weak solution will liberate additional heat which assists in vaporizing the solution.

Similarly, as the vapor passes from the reservoir upwardly through analyzer column 38, a mass and heat transfer takes place between the weak solution passing downwardly over plates 39 in the column and further enriches the refrigerant content of the vapor.

The vapor then passes through rectifier 35 where it is placed in heat exchange relation with the weak solution passing through coil 36. The heat transfer which takes place in the rectifier results in condensing additional water from the vapor which then leaves the rectifier in a highly purified or enriched state.

The purified refrigerant vapor passes from rectifier 35 through line 58 into the coil of condenser 11. Fan 15 passes air over condenser 11 causing the refrigerant vapor to condense. The condensed refrigerant passes through line 23 and restriction 24 into evaporator 12, as previously explained.

As the vapor passes through rectifier 35, the reflux or solution which is condensed flows by gravity to analyzer 38 and passes downwardly through the analyzer column along with weak solution discharged from outlet 37 of coil 36. This rectifier condensate is heated along with weak solution in the analyzer to produce additional vapor by heat exchange with the strong solution passing through coil 47. By utilizing the heat of the strong solution after it has passed through the generator reservoir 40 but prior to its passage to the solution heat exchanger 36, 45 a gain in cycle efficiency is achieved with minimum over-all heat transfer surface requirements. Consequently, a gain in efficiency is realized by vaporization of ammonia from the rectifier condensate during its passage in heat exchange relation with coil 47. Furthermore, coil 47 adds additional contact surface in analyzer 38 and improves its effectiveness.

Referring particularly to FIGURE 2, there is shown therein a modified embodiment of this invention wherein rectifier 35 is fabricated as a separate vessel from analyzer column 38 and generator reservoir 40. Rectifier 35 comprises shell 146 within which is disposed solution heat exchanger 36, 45. In this embodiment shell 146 comprises a separate vessel which is disposed partially below the level at the top of analyzer column 38 to conserve height as can be seen from the drawing. Passage means 137 is provided to admit vapor from analyzer 38 to rectifier 35. Many of the parts of this figure need not be described in detail because corresponding parts, which have been described with respect to the previous embodiment of the invention, have been designated with similar reference numerals.

The arrangement shown in FIGURE 2 is particularly advantageous where it is desired to reduce the total height of the absorption refrigeration machine by locating rectifier 35 at the same level as the top of analyzer column 38. In this arrangemnt the reflux or condensate formed in the rectifier cannot drain into the top of the analyzer column by gravity, as in the preceding embodiment. While this condensate could be injected into the analyzer column at the level of the lower plates therein, some system efficiency would be lost. In order to overcome this problem, a separate rectifier condensate heat exchanger 141 is employed. Strong solution from coil 48 is passed through a heat exchange coil 147 in rectifier condensate heat exchanger 141. The strong solution passes from coil 147 into inner coil 45 of rectifier 35. Condensate from rectifier 35 passes through line 140 into heat exchanger 141. Ammonia vapor is boiled from the rectifier condensate in heat exchanger 141 by the heat imparted to the condensate from strong solution passing through coil 147 similarly to the preceding embodiment. The condensate then passes through trap 142 into the bottom of generator reservoir 40 and the ammonia vapor passes through rectifier 35 and line 58 to condenser 11.

It will be seen that by the use of this invention the vapor and the concentrated absorbent solution formed in the generator pass concurrently with each other through the generator reservoir, the analyzer, and the rectifier in countercurrent with flow of rectifier condensate and weak solution. Therefore, optimum cycle efficiency, and minimum heat exchange surface is achieved without the need of complicated piping arrangements or multiple solution path splitting schemes. In fact, the entire flow of weak solution passes through the rectifier, solution heat exchanger, analyzer, and generator reservoir to the generator. Furthermore, the constructions described readily lend themselves to fabrication with a minimum number of joints and pipes, thus reducing both manufacturing cost and locations at which leakage might take place.

While preferred embodiments of this invention have been described for purposes of illustration, it will be appreciated that this invention may otherwise be embodied within the scope of the following claims.

I claim:
1. An absorption refrigeration system comprising:
 (A) an absorber for absorbing refrigerant vapor;
 (B) an evaporator for evaporating refrigerant and providing a cooling effect;
 (C) a generator for concentrating weak absorbent solution by vaporizing refrigerant therefrom;
 (D) a condenser for condensing refrigerant vaporized in said generator;
 (E) a solution heat exchanger for passing strong solution from said generator to said absorber in heat exchange relation with weak solution passing from said absorber to said generator;
 (F) a generator reservoir connected to receive weak absorbent solution from said solution heat exchanger and to pass said weak solution to said generator, said generator reservoir comprising:
  (1) a substantially horizontal solution passage for storing weak absorbent solution passed to said reservoir from heat exchanger and passing it to said generator,
  (2) a substantially horizontal vapor passage for passing vapors formed in said generator to said condenser, and
  (3) a substantially horizontal heat exchanger disposed in said generator reservoir for passing strong solution from said generator in heat exchange relation with weak solution in said reservoir to boil said weak solution, said heat exchanger having a plurality of portions thereof submerged below the level of weak solution in said generator reservoir and said heat exchanger having a plurality of portions thereof above the level of weak solution in said generator reservoir and extending into said vapor passage so that boiling of weak solution in said reservoir wets the portions of said heat exchanger in said vapor passage to effect a mass and heat transfer between vapor in said vapor passage and weak solution in said reservoir.

2. An absorption refrigeration system comprising:
 (A) an absorber for absorbing refrigerant vapor;
 (B) an evaporator for evaporating refrigerant and providing a cooling effect;
 (C) a generator for concentrating weak absorbent solution by vaporizing refrigerant therefrom;
 (D) a condenser for condensing refrigerant vaporized in said generator;
 (E) a rectifier for enriching the refrigerant content of vapor passed from said generator to said condenser by condensing solution therefrom;
 (F) an analyzer for enriching the refrigerant content of vapor passed from said generator to said condenser by effecting mass and heat transfer between said vapor and weak solution passing from said absorber to said generator;
 (G) a rectifier condensate heat exchanger connected to receive condensate formed in said rectifier, and to vaporize refrigerant from the rectifier condensate, said heat exchanger including:
  (1) heat exchange passage means connected to pass strong solution passing from said generator to said absorber in heat exchange relation with said rectifier condensate to form vapor therefrom,
  (2) means to pass vapor formed in said rectifier condensate heat exchanger to said rectifier, and
  (3) means to pass the heated rectifier condensate from said heat exchanger to said generator.

3. An absorption refrigeration system comprising:
 (A) an absorber for absorbing refrigerant vapor;
 (B) an evaporator for evaporating refrigerant and providing a cooling effect;
 (C) a generator for concentrating weak absorbent solution by vaporizing refrigerant therefrom;
 (D) a condenser for condensing refrigerant vaporized in said generator;
 (E) a combined rectifier and heat exchanger connected to pass weak absorbent solution passing from said absorber to said generator in heat exchange relation with both refrigerant vapor passing from said generator to said condenser and strong absorbent solution passing from said generator to said absorber;
 (F) a generator reservoir containing weak solution passing from said absorber to said generator, said generator reservoir including:
  (1) vapor passage means for passing vapor formed in said generator in mass and heat transfer relation with said weak solution in said generator reservoir; and (2) liquid passage means for passing relatively hot strong solution passing from said generator to said absorber in heat exchange relation with weak solution in said generator reservoir to form vapor in said reservoir, said refrigerant vapor formed in said generator reservoir passing with refrigerant vapor formed in said generator to said analyzer and rectifier to enrich the refrigerant content thereof.

4. An absorption refrigeration system comprising:
(A) an absorber for absorbing refrigerant vapor;
(B) an evaporator for evaporating refrigerant and providing a cooling effect;
(C) a generator for concentrating weak absorbent solution by vaporizing refrigerant therefrom;
(D) a condenser for condensing refrigerant vaporized in said generator;
(E) a combined rectifier and solution heat exchanger connected to simultaneously pass weak absorbent solution passing from said absorber to said generator in heat exchange relation with both refrigerant vapor passing from said generator to said condenser and strong absorbent solution passing from said generator to said absorber;
(F) an analyzer connected to pass vapor from said generator to said rectifier in mass and heat transfer relation with weak solution passing from said rectifier to said generator;
(G) passage means for passing condensate formed in said rectifier to said analyzer in heat exchnage relation with strong solution passing from said generator to said rectifier through said analyzer, and to simultaneously pass said condensate in mass and heat transfer relation in said analyzer with vapor passing from said generator to said rectifier; and
(H) a generator reservoir connected to pass weak solution passing from said analyzer to said generator in mass and heat transfer relation with vapor passing from said generator to said analyzer and in heat exchange relation with strong solution passing from said generator to said analyzer.

5. An absorption refrigeration system comprising:
(A) an absorber for absorbing refrigerant vapor;
(B) an evaporator for evaporating refrigerant and providing a cooling effect;
(C) a generator for concentrating weak absorbent solution by vaporizing refrigerant therefrom;
(D) a condenser for condensing refrigrant vaporized in said generator;
(E) a solution heat exchanger for passing strong solution from said generator to said absorber in heat exchange relation with weak solution passing from said absorber to said generator;
(F) a generator reservoir for storing weak solution in said system after its passage through said solution heat exchanger and prior to its passage to said generator, said generator reservoir including liquid heat exchange means for passing strong solution from said generator in heat exchange relation with weak solution in said generator reservoir prior to the passage of the strong solution through said solution heat exchanger, to utilize the heat of said strong solution to boil refrigerant vapor from said weak solution in said generator reservoir; and
(G) an analyzer for passing vapor formed in said generator and said generator reservoir in mass and heat transfer relation with weak solution passing from said solution heat exchanger to said generator reservoir, said analyzer also including heat exchange means for passing strong absorbent solution from said heat exchange means in said generator reservoir to said solution heat exchanger in heat exchange relation with vapor and weak solution in said analyzer, so as to effect a concurrent flow of vapor and strong solution through said generator reservoir and said analyzer in counterflow with weak solution passing therethrough.

References Cited by the Examiner

UNITED STATES PATENTS

| | | | |
|---|---|---|---|
| 2,191,551 | 2/1940 | Ullstrand | 62—496 X |
| 2,201,362 | 5/1940 | Bergholm | 62—496 X |
| 2,203,074 | 6/1940 | Anderson | 62—496 X |
| 2,241,621 | 5/1941 | Shoeld | 62—495 X |
| 2,295,064 | 9/1942 | Ullstrand | 62—495 X |
| 3,038,321 | 6/1962 | Merrick | 62—495 |

LLOYD L. KING, *Primary Examiner.*